US011389720B2

(12) United States Patent
Maitlen et al.

(10) Patent No.: US 11,389,720 B2
(45) Date of Patent: Jul. 19, 2022

(54) TRANSFERRING CONTROL ELEMENTS FOR A GAMING SESSION BETWEEN DEVICES

(71) Applicant: Microsoft Technology Licensing, LLC, Redmond, WA (US)

(72) Inventors: Craig Ray Maitlen, Redmond, WA (US); Christopher Michael Novak, Woodinville, WA (US); Telmen Gerel Dzjind, Seattle, WA (US); Aron Richard Chavez, Issaquah, WA (US); Joseph Wheeler, Sammish, WA (US); Tyler Paul Esselstrom, Mercer Island, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 112 days.

(21) Appl. No.: 16/802,482

(22) Filed: Feb. 26, 2020

(65) Prior Publication Data

US 2021/0260470 A1 Aug. 26, 2021

(51) Int. Cl.
*A63F 13/22* (2014.01)
*A63F 13/235* (2014.01)

(52) U.S. Cl.
CPC ............ *A63F 13/22* (2014.09); *A63F 13/235* (2014.09)

(58) Field of Classification Search
CPC ................................ A63F 13/22; A63F 13/235
USPC .......................................................... 463/37
See application file for complete search history.

(56) References Cited

U.S. PATENT DOCUMENTS

| 7,925,022 B2 | 4/2011 | Jung et al. |
| 8,944,922 B2 | 2/2015 | Westerberg |
| 9,037,850 B2 * | 5/2015 | Ziv .................... H04N 21/4126 713/159 |

(Continued)

FOREIGN PATENT DOCUMENTS

| WO | 2009073797 A1 | 6/2009 |
| WO | 2014171870 A1 | 10/2014 |
| WO | 2017201472 A1 | 11/2017 |

OTHER PUBLICATIONS

"Enable Network Game Transfer", Retrieved from: https://web.archive.org/web/20181024032318/https:/support.xbox.com/en-US/xbox-one/console/enable-network-game-transfer-xbox-one, Oct. 24, 2018, 3 Pages.

(Continued)

*Primary Examiner* — Allen Chan
(74) *Attorney, Agent, or Firm* — Ray Quinney & Nebeker P.C; James Bullough

(57) ABSTRACT

The present disclosure relates to systems, methods, and computer-readable media for facilitating a convenient transfer of control elements for a gaming session from one device to another device without interrupting the gaming session for one or more players. For example, systems disclosed herein include pairing an input device (e.g., a gaming controller) with one or more client devices. Once paired, the input device may detect a trigger condition based on proximity of a registered client device to the input device. The client device may pull control of one or more control elements for the gaming session. The client device may then continue the gaming session without interrupting the experience for the user or for other users that may be engaged within the gaming session.

20 Claims, 9 Drawing Sheets

(56) References Cited

U.S. PATENT DOCUMENTS

| | | | |
|---|---|---|---|
| 9,672,688 B2* | 6/2017 | Lyons | G07F 17/3211 |
| 9,754,443 B2* | 9/2017 | Hedrick | G07F 17/3225 |
| 9,795,879 B2* | 10/2017 | Colenbrander | A63F 13/49 |
| 10,225,711 B2 | 3/2019 | Parks et al. | |
| 2010/0278345 A1 | 11/2010 | Alsina et al. | |
| 2011/0314153 A1 | 12/2011 | Bathiche et al. | |
| 2013/0046893 A1* | 2/2013 | Hauser | G06F 9/4856 |
| | | | 709/226 |
| 2013/0310163 A1* | 11/2013 | Smith | G07F 17/3241 |
| | | | 463/26 |
| 2014/0094272 A1* | 4/2014 | Kelly | G07F 17/3225 |
| | | | 463/25 |
| 2014/0179428 A1 | 6/2014 | Miura et al. | |
| 2014/0287836 A1 | 9/2014 | Chan et al. | |
| 2017/0312626 A1 | 11/2017 | Colenbrander | |

OTHER PUBLICATIONS

"International Search Report and Written Opinion Issued in PCT Application No. PCT/US21/014052", dated May 3, 2021, 14 Pages.

* cited by examiner

TRANSFERRING CONTROL ELEMENTS FOR A GAMING SESSION BETWEEN DEVICES

BACKGROUND

Recent years have seen rapid development in communication technology, particularly in the capabilities of electronic devices to communicate with one another over wireless networks. For example, it is now common for individuals to own and use multiple computing devices of different types to access and consume digital content (e.g., gaming content). In addition, as cloud computing becomes more prevalent and communication capabilities of computing devices continues to develop, a wider variety of devices are being used to consume digital content for an increasingly diverse set of end-users.

In many cases, individuals find that different devices may be better suited for different scenarios. For example, in the context of gaming, individuals may find that mobile devices are ideal for consuming gaming content while traveling or when meeting at a public place. Alternatively, the same individuals may prefer to consume gaming content on a home console coupled to a television or other display device when consuming content at their home. In some cases, individuals may wish to transition between different gaming setups. Conventional gaming and communication systems, however, suffer from a number of drawbacks and limitations.

In particular, conventional systems for handing off a gaming session from one device to another often involves interrupting or otherwise causing friction to the continuity of a gaming session. For example, many conventional systems involve interrupting a gaming session to perform a setup process that involves manually pressing buttons on multiple devices to cause those devices to connect with one another. As another example, many conventional systems involve exiting a game or application in order to modify settings or otherwise indicate a desire to modify a gaming setup for the gaming session. In each of the above examples, delay and user frustration may occur, particularly where a user is engaged with a gaming session that includes other users (e.g., multiplayer applications).

These and other problems exist with regard to transitioning between different setups or device environments when consuming digital content.

DETAILED DESCRIPTION

Figure 1:
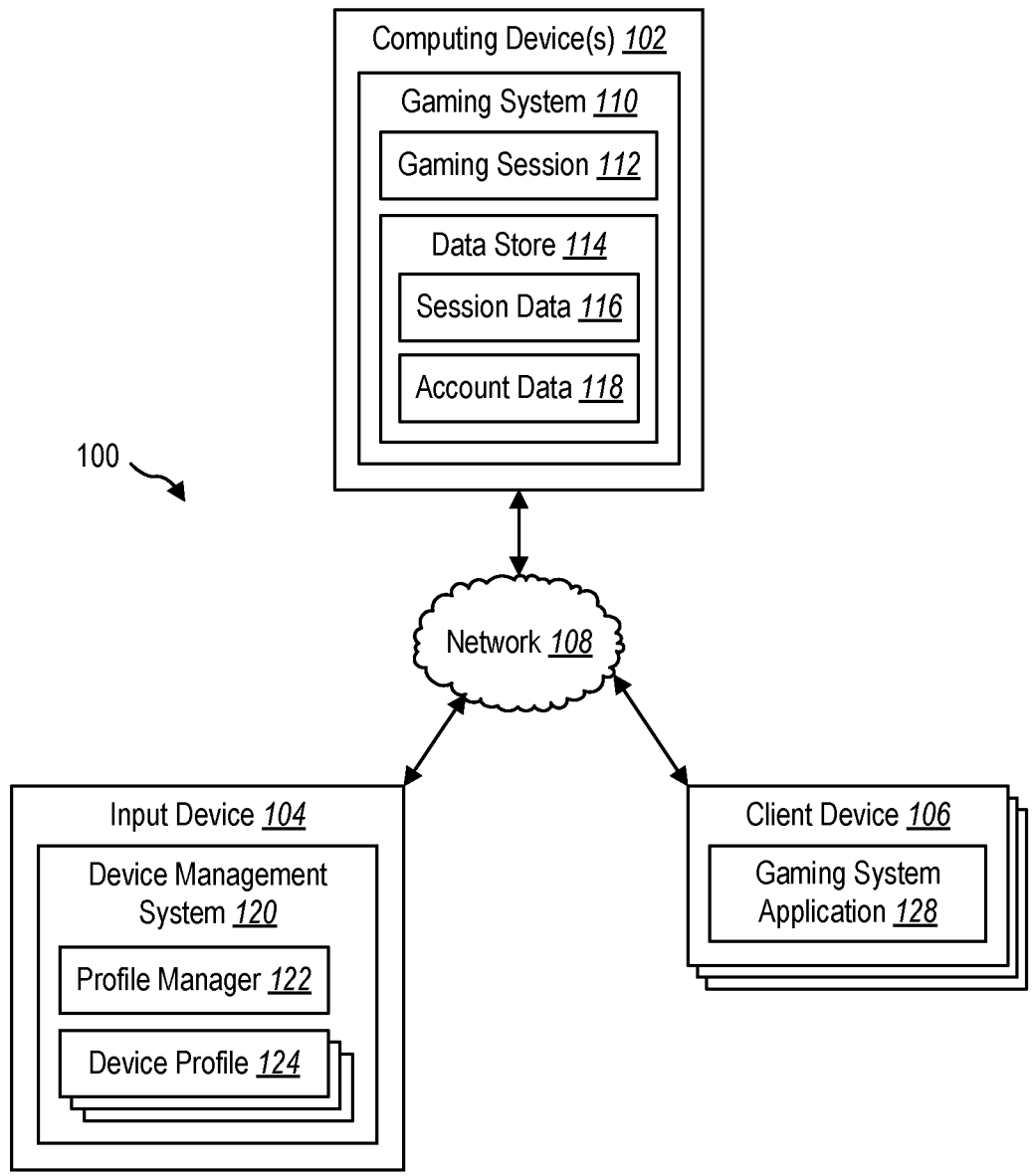
FIG. 1 illustrates an example environment including a device management system for managing connection of one or more devices with a gaming system in accordance with one or more embodiments.

The present disclosure relates to a device management system on an input device (e.g., a gaming controller) that facilitates a handoff of one or more gaming session control elements (or simply "control elements") between computing devices without interrupting a current gaming session. In particular, as will be discussed in further detail below, a device management system may be implemented on an input device, such as a gaming controller, to enable a convenient and friction-free transfer of control elements of a gaming session from one device to another device. Indeed, as will be discussed in further detail below, once an input device is paired to a client device, the input device having the device management system implemented thereon may be used to facilitate transfer of control for the gaming session to the client device at any point within a gaming session.

For example, and as will be discussed in further detail below, an input device and a client device may perform a pairing process in which the input device and client device exchange information that enables the input device to identify a proximity of the input device as well as enable the client device to connect to a gaming system. While engaged in a gaming session in which the input device provides input commands to a gaming system (e.g., a local console and/or a cloud-based gaming system), the input device and client device may identify or otherwise detect a trigger condition (e.g., a tap of a gaming controller and client device) that indicates a desire to transfer control of a gaming session to the client device. In response to the trigger condition, the client device can pull or otherwise obtain control of control elements such as input control, video control, and any other control elements of the gaming session.

The present disclosure includes a number of practical applications that provide benefits and/or solve problems associated with conventional systems and techniques for dynamically modifying a configuration of devices for an ongoing gaming session. In particular, the systems described herein provide specific features and functionalities that allow transfer of control elements for a gaming session from one device to another device without interrupting a current gaming session hosted by a gaming system. Moreover, systems described herein enable transfer of a gaming session independent of whether the gaming session is hosted by a local console or on a console implemented as part of a cloud computing system.

For example, in one or more embodiments described herein, an input device may facilitate a fast and efficient transfer of input control (and other control elements) by storing any number of device profiles corresponding to respective client devices that are capable of pulling or otherwise receiving control of a gaming session from another device. In particular, once paired to a given client device and after storing an associated device profile as part of the pairing process, the device management system may utilize the stored device profile to detect a trigger condition based on detecting proximity of a client device that matches the device profile stored on the input device. In this way, the device management system may be preconfigured to recognize the client device and cause a portion of control (e.g., input control, video control) of the gaming session to be transferred to the client device upon detecting the trigger condition.

In addition to reducing friction of transferring control elements by storing device profiles, the device management system may utilize two or more communication protocols to detect one of any number of client devices having a range of capabilities and cause control of the gaming session to be transferred to a diverse set of client devices. For instance, where the input device may be configured to communicate with a gaming system using a first communication protocol that optimizes features of the input device and/or gaming system in a given device environment, the same communication protocol may be less optimal (or incompatible) for another client device. Accordingly, the device management system can enhance the flexibility of engagement with the gaming system by communicating with the gaming system using a first protocol (e.g., a proprietary protocol unique or otherwise specific to the input device and/or gaming console) while using a second protocol to communicate with or detect presence of a more generic client device (e.g., a mobile device, laptop device, etc.).

In addition to providing additional flexibility in allowing a range of client devices to communicate with a gaming system, communicating using different communication protocols (e.g., using different antennas) can provide a frictionless handoff of control while significantly improving power performance of the input device. For example, where communicating using a first communication protocol consumes significantly more power than communicating using a second protocol, utilizing the different communication protocols enhances performance of the input device by consuming less power when transmitting signals to detect a presence of a client device. Moreover, by allowing client devices to communicate with the gaming system using a variety of communication protocols, respective client devices may further optimize performance over systems that would need to communicate with the gaming system using the same communication protocol as the input device. Thus, by utilizing multiple antennas of different types or that transmit signals using different communication protocols; one or more embodiments described herein can improve power performance of the input device and other devices within an environment of the gaming system.

As illustrated in the foregoing discussion, the present disclosure utilizes a variety of terms to describe features and advantages of a device management system within a variety of computing environments. Additional detail will now be provided regarding the meaning of such terms. For example, as used herein, an "input device" may refer to any electronic or computing device configured to communicate input commands with a gaming system. In one or more embodiments described herein, an input device refers specifically to a gaming controller or other dedicated hardware device associated with a gaming system and including hardware and/or software thereon that enables the gaming controller to communicate input commands using a first communication protocol. As will be discussed in further detail below, an input device may include any number of antennas capable of communicating with other devices using a number of different communication protocols.

As used herein, a "gaming session" may refer to an application and associated duration of time that a user or multiple users have access to the gaming session. In one or more embodiments, the gaming session may refer to a period of time commencing when an individual (e.g., a user or player) initiates a gaming application and ending when the individual (or other individual) terminates the gaming session. For example, a gaming session may begin when a user opens an application and end when the user closes the gaming session, concludes a game, loses connectivity with a gaming system, and/or when the user logs off or otherwise disconnects a device from the gaming session (e.g., for a threshold or other predetermined period of time). In one or more embodiments described herein, a single gaming session may include a first portion of the gaming session when a user engages with or consumes gaming content using a first device as well as a second portion when the user engages with or consumes gaming content using a second device upon completing transfer of one or more control elements to the second device. The gaming session may continue for any number of transfers of control elements between devices and end upon the user logging off, disconnecting, or otherwise disengaging with the gaming system for a predetermined period of time.

As used herein, a "control element" of a gaming session may refer to one or more elements of the gaming session associated with consuming the gaming session by an individual. For example, a control element may refer to input control, video control, audio control, voice control, or other control associated with how the individual interacts with a gaming system and/or consumes gaming content. To illustrate, a device (e.g., input device, client device) may have input control when the device has an active communication link with the gaming system such that the gaming system recognizes input commands transmitted by the device. As another example, a device may have video control or audio control where the device receives a stream of video and/or audio content from the gaming system for the gaming session.

As used herein, a "communication protocol" may refer to a particular format associated with communicating information between two devices. In particular, a communication protocol may refer to a set of rules, syntax, semantics, synchronization, and possible error recovery methods associated with a method for communication between two respective devices. In one or more embodiments described herein, a communication protocol refers to the type of network or wireless connection over which two different devices communication. For example, in one or more embodiments described herein, a communication protocol refers to a proprietary protocol unique or otherwise specific to a gaming controller and a gaming console (e.g., a manufacturer or brand of the respective devices/consoles). Other example communication protocols may refer to WiFi, Bluetooth (e.g., Bluetooth Low Energy (BLE)), near field communication (NFC) or other wireless protocol. Indeed, the communication protocols described herein may refer to any number of communication protocols that enable devices, such as an input device, client device, and/or gaming system to communicate over a variety of different networks (e.g., wired or wireless networks).

Additional detail will now be provided regarding a device management system in relation to illustrative figures portraying example implementations. For example, FIG. 1 illustrates an example environment 100 including one or more computing device(s) 102, an input device 104, and a client device 106 (e.g., multiple client devices) in accordance with one or more embodiments described herein. Each of the computing device(s) 102, input device 104, and client device 106 may communicate over a network 108, which may include one or multiple networks that use one or more communication protocols or technologies for transmitting data. For example, the network 108 may include the internet, a local area network (LAN), or any data link that enables transport of electronic data between the computing device(s) 102, input device 104, and/or client device 106.

In one or more embodiments described herein, the computing device(s) 102 may refer to a local gaming console, desktop computer, or other computing device capable of hosting one or more gaming sessions for one or more gaming applications. Alternatively, in one or more embodiments, the computing device(s) 102 refers to one or more server devices and/or gaming consoles implemented within a datacenter or otherwise implemented on a cloud computing system. As used herein, a cloud computing system may include a collection of physical server devices organized in a hierarchical structure including computing zones, virtual LANs, racks, fault domains, etc. In one or more embodiments described herein, a cloud computing system may include any number of gaming consoles capable of hosting gaming sessions for a variety of end-users.

As illustrated in FIG. 1, the computing device(s) 102 may include a gaming system 110 implemented thereon. The gaming system 110 may host a gaming session 112 accessible to one or multiple users of the gaming system 110 for some duration of time. The gaming system 110 may host or otherwise provide access to any number of additional gaming sessions associated with the same application or a variety of applications. In one or more embodiments, the gaming system 110 hosts or otherwise provides access to the gaming session 112 hosted by one or more additional server devices (e.g., servers owned or operated by third-party publishers).

As shown in FIG. 1, the gaming system 110 includes a data storage 114 including data stored thereon or otherwise accessible to the gaming system 110. For example, as shown in FIG. 1, the data storage 114 may include session data 116. The session data may include any information associated with one or more gaming sessions. For example, the session data 116 may include information about users or devices engaged within the gaming session. The session data 116 may include a state of data for an application associated with the gaming session. For example, the session data 116 may include a current state of characters or a virtual environment for the gaming session at a current time or at one or more previous times.

As further shown, the data storage 114 may include account data 118 associated with one or more users of the gaming system 110. For example, the account data 118 may include user identifiers, authentication information (e.g., passwords, security tokens, etc.) or any information associated with users of the gaming system 110 and associated client devices. In one or more embodiments described herein, the gaming system 110 can utilize the account data 118 to verify an identity of an input device 104 and/or client device 106 in determining whether to allow the client device 106 to pull one or more control elements for the gaming session 112 from the input device 104 (or other device).

As mentioned above, the input device 104 may refer to an electronic or computing device configured to communicate input commands to the gaming system 110 in connection with a gaming session 112. In one or more embodiments described herein, the input device 104 refers to a gaming controller or console controller associated with the gaming system 110. For example, the input device 104 and hardware of the gaming system 110 (e.g., a gaming console) may originate from the same company or manufacturer and may include compatible hardware, firmware, and/or software that enables the input device 104 to communicate via a specific communication protocol (e.g., a proprietary protocol unique to communications between the input device 104 and gaming system 110).

As shown in FIG. 1, the input device 104 may include a device management system 120 implemented thereon. As will be discussed in further detail herein, the device management system 120 may provide features and functionality to facilitate communication between the input device 104 and other devices of the environment 100. The device management system 120 can additionally facilitate pairing with one or more client devices 106 in addition to facilitating handoff of one or more control elements for an ongoing gaming session 112.

The device management system 120 may include a profile manager 122 and device profiles 124. The profile manager 122 may facilitate performing a pairing process with one or more client devices 106. For example, the profile manager 122 may monitor proximity of one or more devices in pairing mode and performing a pairing process by collecting information about the device(s) and creating device profiles 124 associated with the respective devices to store on the input device 104. The device management system 120 may include any number of device profiles 124 corresponding to any number of client devices 106. In addition, or as an alternative, the device management system 120 may include any number of device profiles 124 corresponding to a number of antennas (e.g., antennas 126a-n) on the input device 104.

In addition to performing a pairing process, the profile manager 122 can facilitate detecting a trigger condition based on a detected proximity of the input device 104 relative to one or more client devices 106. For example, the profile manager 122 may cause the input device 104 to announce, broadcast, or otherwise transmit a signal to determine whether a client device 106 corresponding to one of the device profiles 124 comes into proximity of the input device 104. Further detail in connection with detecting a proximity condition will be discussed in further detail below.

As shown in FIG. 1, the input device 104 further includes a number of antennas 126a-n capable of communicating signals to and from the input device 104. As mentioned above, the input device 104 may include a variety of different types of antennas 126a-n capable of transmitting (and/or receiving) signals using different communication protocols. The device management system 120 may include firmware, software, or a combination of firmware and software that facilitate communication of data using each of the antennas 126a-n on the input device 104.

It will be appreciated that the input device 104 may include any number of antennas 126a-n. For example, in one or more embodiments, the input device 104 may include 2, 4, 8, or other specific number of antennas. In one or more implementations, the number of antennas on the input device 104 may determine a number of device profiles 124 that may be registered or stored on the input device 104. For example, where the input device 104 has four antennas, the input device 104 may utilize a first antennas to communicate with the gaming system 110 using a first communication protocol and register up to three device profiles associated with three different client devices with which each of the remaining three antennas may communicate using one or more additional communication protocols.

As an illustrative example, and as will be discussed in further detail below, a first antenna 126a may refer to an antenna configured to communicate signals using a first communication protocol. For example, the first antenna 126a may refer to a first type of antenna unique to the input device 104 capable of transmitting input commands to the gaming system 110 using a first communication protocol (e.g., a proprietary communication protocol unique to the input device 104 and gaming system 110).

In contrast, the second antenna 126b (and one or more additional antennas) may refer to a second type of antenna capable of communicating wirelessly with a variety of client devices 106. For instance, the second antenna 126b may transmit signals using a second communication protocol (e.g., WiFi, BLE, NFC, etc.) different from the first communication protocol. Additional antennas of the plurality of antennas 126a-n may refer to other types of antennas that are capable or otherwise configured to communicate signals using other types of protocol s (e.g., the same or different from the second antenna 126b). Additional information in connection with the plurality of antennas 126a-n will be discussed in further detail below in connection with various examples.

As mentioned above, the environment 100 may include one or more client device 106. The client devices 106 may refer a variety of different types of devices. For example, in one or more embodiments, the client device 106 may refer to a portable device such as a mobile device (e.g., a smartphone, a tablet), a laptop, or other computing device capable of being carried or transported by a user. Alternatively, the client device may refer to a non-portable device such as a desktop, smart television, entertainment system, or other system of devices having data processing and display capabilities. Indeed, the client device(s) 106 may refer to any device capable of communicating with the input device 104 using a second communication protocol and subsequently receiving gaming content and/or transmitting input commands to the gaming system 110 in accordance with one or more embodiments.

As shown in FIG. 1, the client device 106 may include a gaming system application 128 implemented thereon. The gaming system application 128 may refer to a software application (e.g., stand-alone application, web browser, combination of multiple applications) associated with the gaming system 110 including executable instructions enabling the client device 106 to access or obtain control of one or more control elements for the gaming session 112 (e.g., pulling input control from the input device 104). For example, the gaming system application 128 may cause the client device 106 to register the device and/or user with the gaming system 110 before or in conjunction with performing a pairing process with the input device 104. In addition, the gaming system application 128 may include instructions that cause the client device 106 to communicate with the gaming system 110 upon detecting a trigger condition associated with proximity of the client device 106 to the input device 104.

Figure 2A:
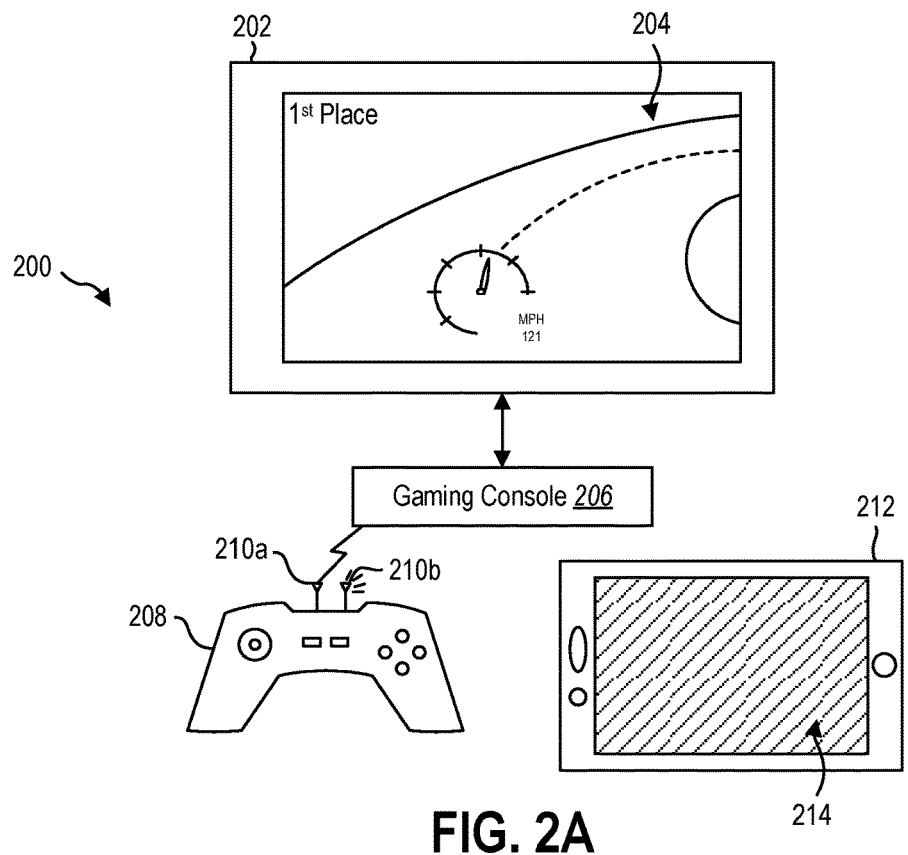
FIGS. 2A-2C illustrates an example implementation of transferring input control from an input device to a client device in accordance with one or more embodiments.
Figure 2B:
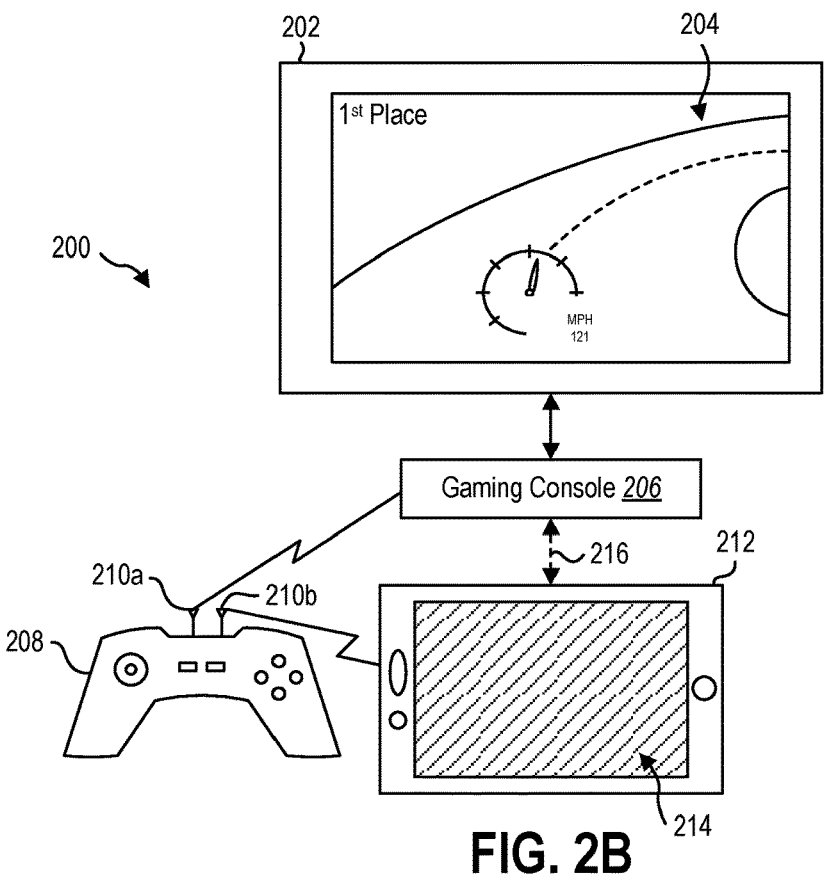
Figure 2C:
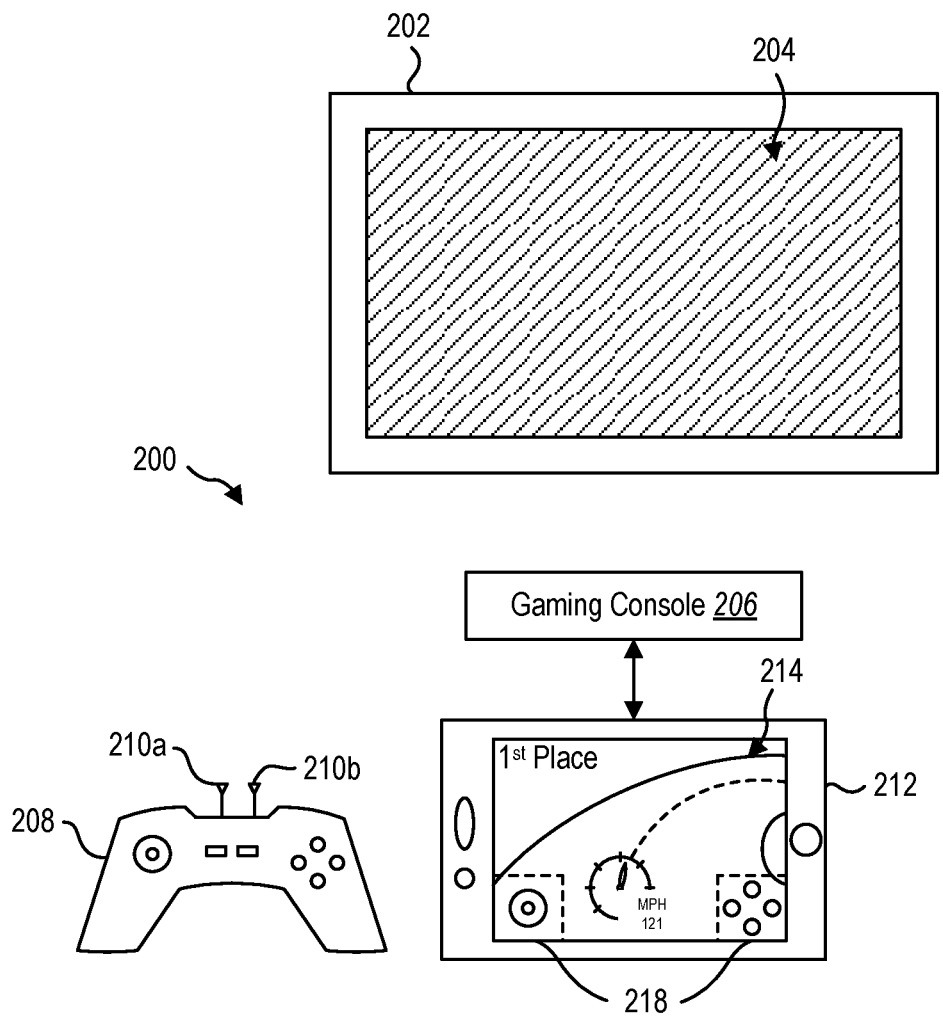
Figure 3A:
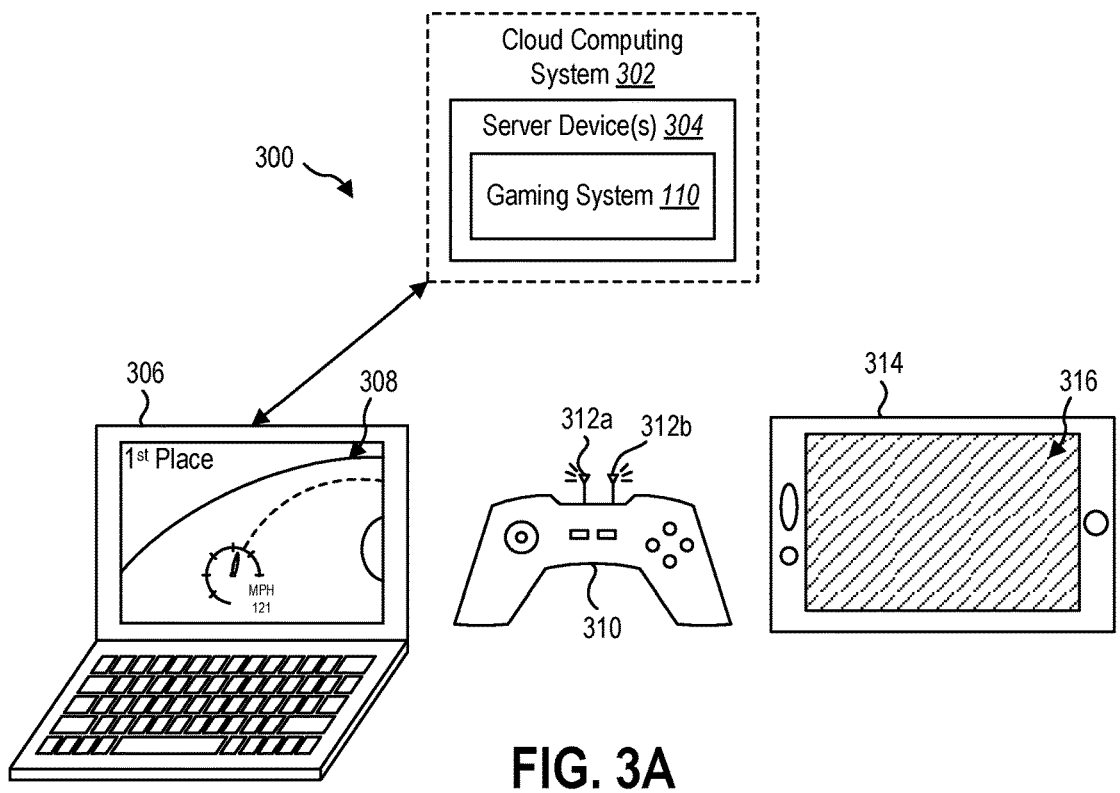
FIGS. 3A-3C illustrate an example implementation of transferring input control between client devices in accordance with one or more embodiments.
Figure 3B:
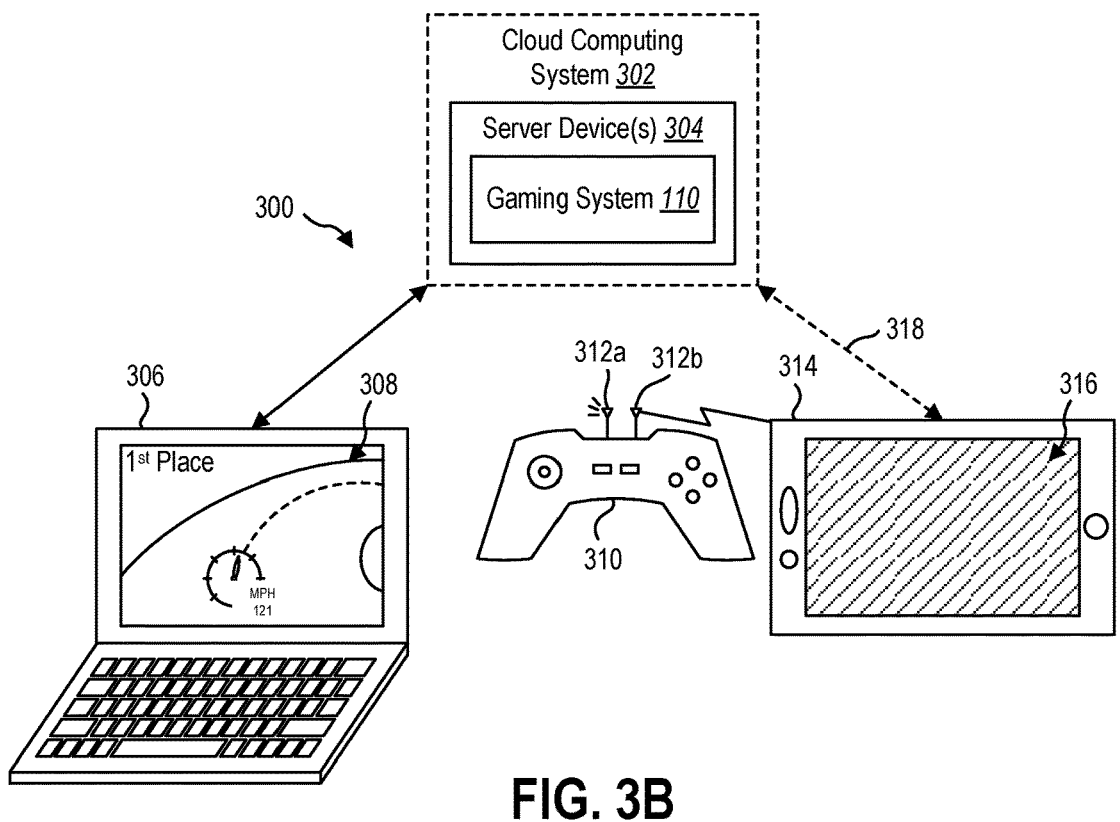
Figure 3C:
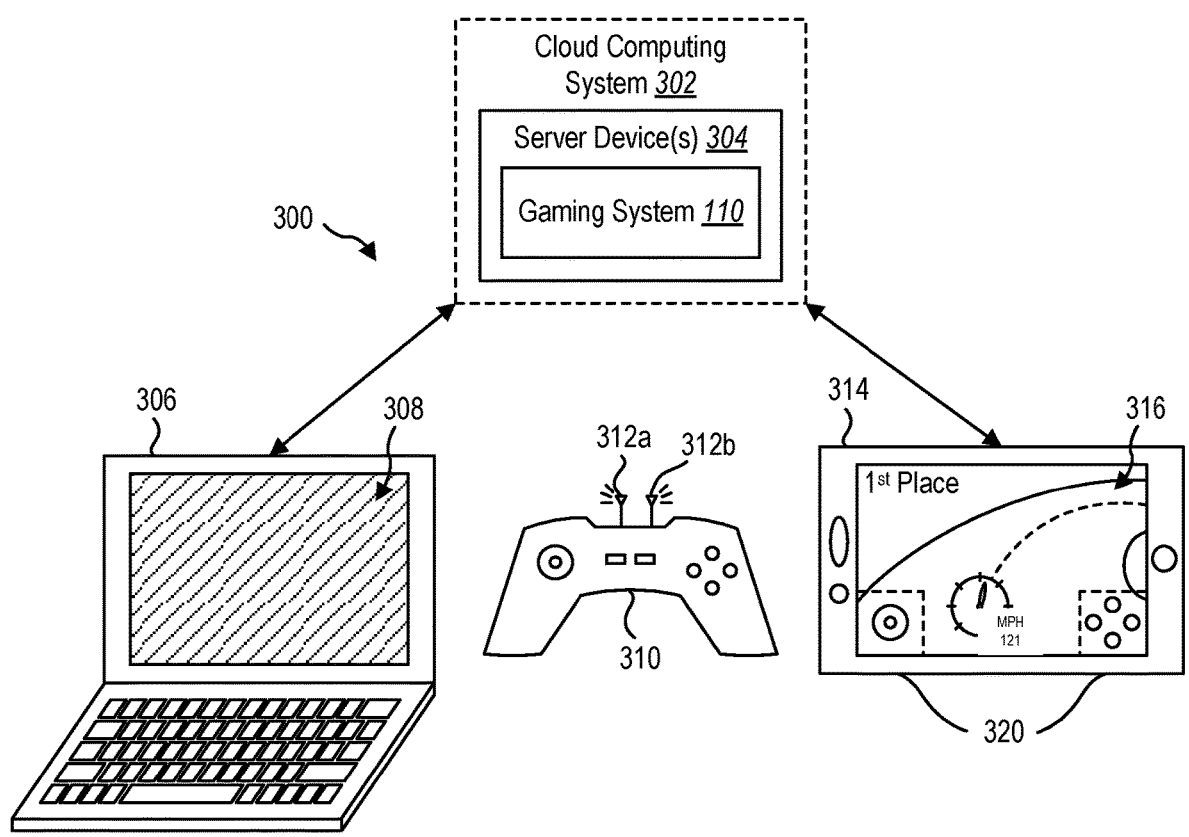
Figure 4:
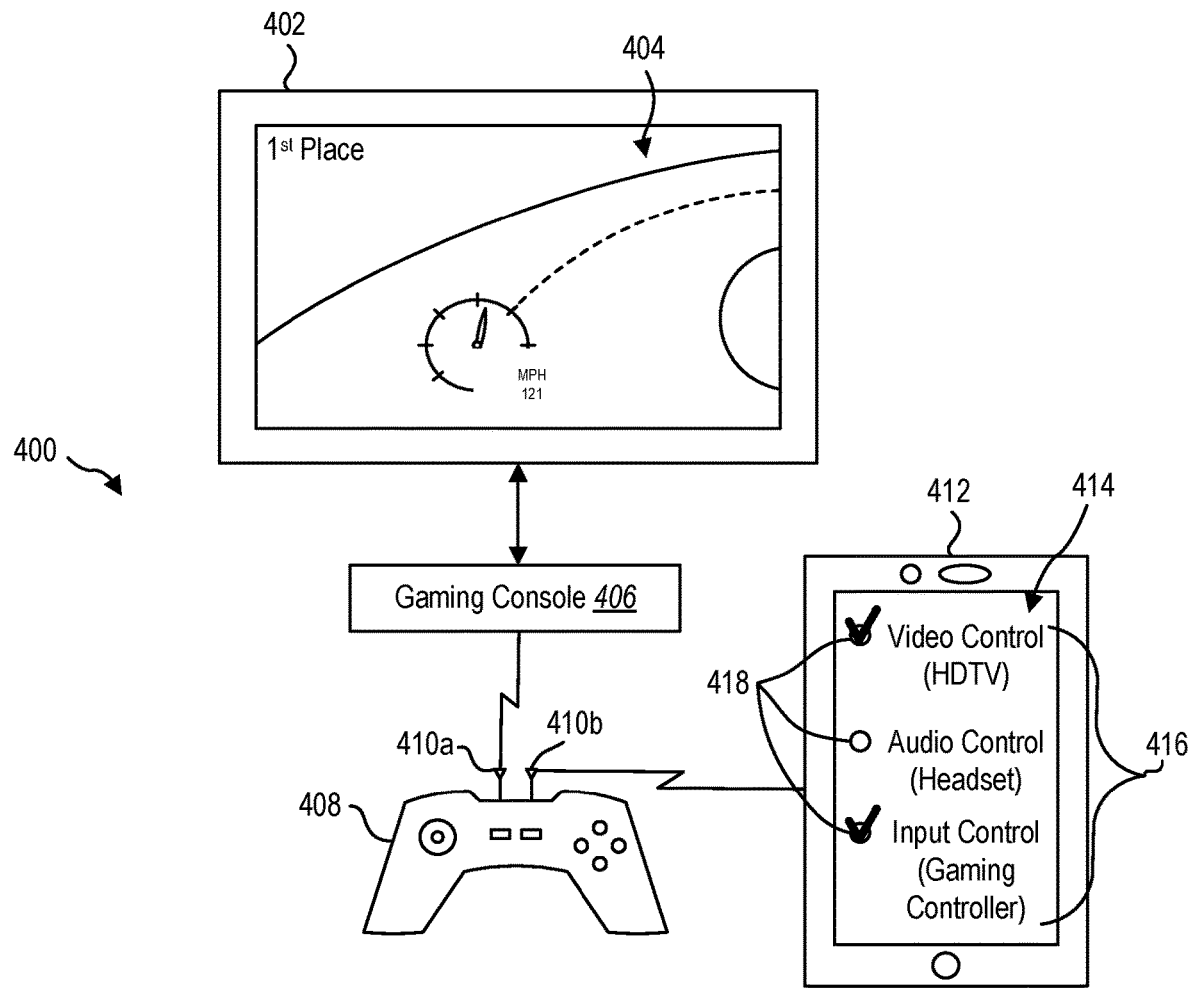
FIG. 4 illustrates an example implementation of a graphical user interface for selectively transferring control elements of a gaming session between devices in accordance with one or more embodiments.

Additional detail in connection with transferring one or more control elements for a gaming session from one device to another device will now be described in connection with example implementations. For example, FIGS. 2A-2C illustrate an example implementation in which a gaming controller is used to transfer input control for a gaming session to a client device (e.g., a mobile device) in accordance with one or more embodiments. FIGS. 3A-3C illustrate another example implementation in which a gaming controller is used to transfer one or more control elements for a gaming session between a first client device (e.g., a laptop computer) to a second client device (e.g., a mobile device) in accordance with one or more embodiments. FIG. 4 illustrates another example implementation in which a gaming controller and a graphical user interface facilitate selectively transferring one or more of a plurality of control elements for a gaming session to a client device in accordance with one or more embodiments.

It will be understood that while FIGS. 2A-4 illustrate three implementations within different environments of devices, features and functionality described in connection with each of the individual examples may similarly apply to another example. For example, features and functionality described in connection with FIGS. 2A-2C may apply to examples described in connection with FIGS. 3A-4. Similarly, features and functionality described in connection with FIGS. 3A-3C may apply to examples described in connection with FIGS. 2A-2C and FIG. 4. Moreover, features and functionality described in connection with FIG. 4 may apply to examples described in connection with FIGS. 2A-3B.

FIG. 2A illustrates an example environment 200 including a display device 202 having a graphical user interface 204. The display device 202 may be in communication (e.g., have an active connection) with a gaming console 206. The gaming console 206 (and the display device 202) may include similar features and functionality as the computing device(s) 102 discussed above in connection with FIG. 1. In this example, the gaming console 206 refers to a local gaming console having the gaming system 110 implemented thereon and capable of hosting a gaming session for a user of the gaming console 206. Alternatively, the gaming console 206 may receive gaming content from a server device on a cloud computing system hosting one or more gaming sessions for the user of the gaming console 206 and/or other users of the gaming system 110.

As shown in FIG. 2A, the environment 200 further includes a gaming controller 208 having antennas 210a-b thereon capable of communicating with other devices of the environment 200. The gaming controller 208 may refer to one example of the input device 104 discussed above in connection with FIG. 1. As further shown, the environment 200 includes a client device 212 (e.g., a mobile device) having a graphical user interface thereon 214. The client device 212 may refer to an example implementation of the client device 106 having the gaming system application 128 thereon as discussed above in connection with FIG. 1.

In accordance with subject matter discussed above, the gaming controller 208 and the client device 212 may have previously performed a pairing process. For example, as part of a pairing process, the gaming controller 208 may collect information about the client device 212 to store within a device profile on the gaming controller 208. As will be discussed further in FIGS. 2B-2C, the gaming controller 208 may utilize the device profile(s) on the gaming controller 208 to identify the client device 212 and facilitate transfer of one or more control elements for a gaming session hosted on the gaming console 206 to the client device 212.

As shown in FIG. 2A, the gaming console 206 may be connected to the display device 202 to provide video control for the gaming session to the display device 202. In particular, the gaming console 206 may provide video control to the display device 202 by streaming or otherwise providing video content for the gaming session to display via a graphical user interface 204 of the display device 202. In one or more embodiments, the gaming console 206 additionally provides audio control by providing audio content via one or more speakers of the display device 202. While not shown in FIG. 2A, the gaming console 206 may provide audio control to one or more additional devices (e.g., a headset, auxiliary speaker) in communication with the gaming console 206 (or coupled to the display device 202).

As further shown, the gaming console 206 may be connected to or have ongoing communication with the gaming controller 208. In particular, the gaming console 206 and the gaming controller 208 may communicate via a first antenna 210*a* on the gaming controller 208. In accordance with one or more examples described herein, the first antenna 210*a* may refer to a first type of antenna that communicates with the gaming console 206 using a first communication protocol associated with the first antenna 210*a*. The first communication protocol may refer to any of a number of communication protocols that enable the gaming controller 208 to transmit input commands to the gaming console 206.

In one or more embodiments, the first communication protocol refers to a unique or proprietary communication protocol associated with specialized or dedicated hardware and/or firmware of the gaming controller 208 and the gaming console 206. For example, in a gaming context where the gaming console 206 may communicate with as many as eight or ten controllers at a given time, the gaming console 206 may be configured to receive input commands from the gaming controller 208 using a proprietary protocol that is optimized for gaming applications and configured to receive input commands across a wide bandwidth of frequencies. In one or more embodiments described herein, the gaming controller 208 communicates using a protocol unique to a manufacturer or specific hardware component of the gaming console 206 and/or the gaming controller 208.

FIG. 2A illustrates the environment 200 prior to detecting a trigger event associated with proximity of the gaming controller 208 and the client device 212. Proceeding onto FIG. 2B, this illustration shows an implementation in which gaming controller 208 and the client device 212 come into contact (e.g., tap together) or within a predetermine proximity of one another in accordance with a trigger condition. In particular, a device management system 120 on the gaming controller 208 and a gaming system application 128 on the client device 212 may cooperatively determine (e.g., based on settings that define what constitutes a trigger condition) whether there is an intent to transfer one or more control elements to the client device 212 from the gaming controller 208 and/or the display device 202.

For example, in one or more embodiments, the gaming controller 208 may transmit a signal from the second antenna 210*b* using a second communication protocol to determine whether a client device (e.g., the client device 212) for which a device profile is stored comes into contact with or moves within a threshold distance from the gaming controller 208. In one or more implementations, the second antenna 210*b* transmits a low power energy signal (e.g., BLE signal) at periodic intervals that may be received and processed by the client device 212. In particular, the second antenna 210*b* may transmit a low power energy signal that any client device having the gaming system application 128 thereon and which has previously paired with the gaming controller 208 may receive and use to establish a connection with the gaming console 206.

As shown in FIG. 2B, the client device 212 may receive a signal transmit from the second antenna 210*b*. In response to receiving the signal, the client device 212 can establish a connection 216 with the gaming console 206 by sending an indication to the gaming console 206 of the trigger condition associated with transferring control of one or more control elements to the client device 212. For example, the client device 212 can provide a request to the gaming console 206 for control of one or multiple control elements for the gaming session. Where a gaming system application 128 on the client device 212 has previously registered the client device 212 with the gaming system 110, the client device 212 may have pre-authorization from the gaming system 110 to pull control of one or multiple control elements for the gaming session from the gaming controller 208.

The client device 212 can pull any number of control elements for the gaming session from other devices within the environment 200. For example, proceeding onto FIG. 2C, the client device 212 can pull multiple control elements for the gaming session from other devices within the environment 200. In particular, the client device 212 can pull video control from the display device 202 by causing video content to be provided via the graphical user interface 214 of the client device 212. As a result, the display device 202 may no longer provide a display of video content for the gaming session.

In addition to pulling video control for the gaming session from the display device 202, the client device 212 may additionally pull input control for the gaming session from the gaming controller 208. Indeed, the client device 212 (or other client device registered on the gaming controller 208) can pull any number of control elements for the gaming session from any number of devices in accordance with a configuration defined by the gaming system application 128 running on the client device 212. For example, where the client device 212 is configured to pull all control elements for the gaming session, the client device 212 may automatically pull all control elements upon detecting the trigger condition. Alternatively, where the client device 212 may input command capabilities or where the client device 212 has some limitation for pulling control of a specific control element, the client device 212 may be configured to only pull a subset of control elements for a given gaming session from any of the devices currently in control of one or more control elements for the gaming session.

As mentioned above, and in the example shown in FIG. 2C, the client device 212 may pull each of the control elements from each of the devices of the environment 200 previously in control of the control elements prior to detecting the trigger condition. Specifically, the client device 212 may pull input control from the gaming controller 208 as indicated by control icons 218 displayed on the graphical user interface 214 of the client device 212. In addition, the client device 212 may pull video and/or audio control from the display device 202 as indicated by the display for the gaming application being presented via the graphical user interface 214 of the client device 212 rather than on the graphical user interface 204 of the display device 202. While not shown in FIG. 2C, in one or more embodiments, the video content may continue streaming to the display device 202 at the same time as displayed on the client device 212.

As shown in FIG. 2C, the client device 212 may begin transmitting input commands to the gaming console 206 upon obtaining input control from the gaming controller 208. In one or more embodiments, the client device 212 communicates input commands to the gaming console 206 using a different communication protocol than the first communication protocol used by the gaming controller 208 (e.g., the second communication protocol or another communication protocol different from the first communication protocol). For example, where the gaming controller 208 transmits input commands via a first antenna 210*a* using a first communication protocol (e.g., a proprietary protocol, WiFi protocol, etc.), the client device 212 may transmit input commands to the gaming console 206 using a second communication protocol (e.g., WiFi, BLE) or any communication protocol different from the first communication protocol.

As mentioned above, FIGS. 3A-3C illustrate another example implementation in which a gaming controller may be used to facilitate one or more client devices obtaining control of control elements for a gaming session. For example, FIG. 3A illustrates an environment 300 including a cloud computing system 302 having one or more server device(s) 304. The server device(s) 304 may include a gaming system 110 including similar features as discussed above in connection with FIG. 1.

As further shown, the environment 300 may include a first client device 306 (e.g., a laptop computer) having a graphical user interface 308. The environment 300 may additionally include a gaming controller 310 having two antennas 312a-b for communicating signals to devices of the environment 300. The gaming controller 310 may include additional antennas. In the example shown in FIG. 3A, the gaming controller 310 includes a first antenna for communicating directly with the gaming system 110 in addition to a plurality of antennas corresponding to respective client devices that have been registered with the gaming system 110 and associated with device profiles stored on the gaming controller 310. The environment 300 may further include a second client device 314 (e.g., a mobile device) having a graphical user interface 316.

As shown in FIG. 3A, the first client device 306 may have an active connection with the gaming system 110 on the cloud computing system 302. As shown in FIG. 3A, the first client device 306 may additionally have control of various control elements for a gaming session including input control, video control, audio control, and any other control elements for the gaming session. The control of these control elements may have been previously established (e.g., similar to the example shown in FIGS. 2A-2C) based on a trigger condition detected between the first client device 306 and the gaming controller 310.

In FIG. 3B, the gaming controller 310 may be placed in contact with or within a proximity of the second client device 314 such that the gaming controller 310 and second client device 314 detect a trigger condition indicating a desire to transfer control of one or more control elements for the gaming session to the second client device 314. In particular, the second antenna 312b may transmit a signal that, when placed in a proximity to the second client device 314, enables the client device 314 to receive the signal. In response to receiving the signal and the devices authenticating one another, the second client device 314 can establish a connection 318 with the gaming system 110 in accordance with instructions of a gaming system application 128 on the second client device 314. For example, the second client device 314 can provide a request to the gaming system 110 indicating one or more control elements that the second client device 314 intends to control based on the indicated desire to transfer one or more of the control elements to the second client device 314.

In FIG. 3C, the second client device 314 can pull control of any number of control elements for the gaming session. For example, the second client device 314 can receive a video stream or audio stream from the cloud computing system 302 for presentation on the graphical user interface 316 of the second client device 314. In addition to receiving the video and/or audio content, the second client device 314 may obtain control of an input control element and provide input icons 320 via the graphical user interface 316 that enables a user of the second client device to indicate input commands to send to the gaming system 110 via the established connection 318 between the second client device 314 and the gaming system 110.

As shown in FIG. 3C, after completion of the transfer of control elements to the second client device 314, the first client device 306 may no longer have an active connection to the gaming system 110. Nevertheless, because the gaming controller 310 has a device profile corresponding to the first client device 306, the gaming controller 310 may be used at any time to tap the first client device 306 or be moved within a proximity of the first client device 306 to indicate a desire to transfer the gaming session back to the first client device 306. In response, the first client device 306 could take back control of one or more control elements of the gaming session in accordance with one or more embodiments described herein.

Moving onto FIG. 4, this example illustrates features and functionality related to a client device selectively taking control of one or more control elements in accordance with one or more embodiments described herein. For example, FIG. 4 illustrates an example environment 400 similar to the environment 200 described above in connection with FIGS. 2A-2C. In particular, the environment 400 includes a display device 402 having a graphical user interface 404 thereon. The environment 400 further includes a gaming console 406. Prior to detecting a trigger condition, the display device 402 may have an active connection with the gaming console 406 to receive and display video content for a gaming session.

The environment 400 further includes a gaming control 408 having a first antenna 410a and a second antenna 410b capable of communicating signals to various devices using different communication protocols. For example, the first antenna 410a may communicate input commands to the gaming console 406 using a first communication protocol. In addition, the second antenna 410b may communicate low power signals to be detected by the client device 412 using a second communication protocol (e.g., NFC, BLE, WiFi).

As shown in FIG. 4, the client device 412 includes a graphical user interface 414. In contrast to one or more specific examples described above, upon detecting a trigger condition, the client device 412 may provide (e.g., display) a list of control elements 416 for the gaming session that are supported by the client device 412. Different client devices may present a different list of control elements depending on capabilities of the client device, settings of a gaming system application 128 on the specific client device, or information from a device profile stored on the gaming controller 408. In this example, the client device 412 may support control of control elements including video control, audio control, and input control.

As shown in FIG. 4, the list of control elements 416 may include selectable options 418 that, when selected, cause the client device 412 to selectively pull control of the selected control elements from a device previously in control of the control element. In addition, the list of control elements 416 may provide an indicator or identifier of a device that currently holds control of the corresponding control elements. For example, the video control may be controlled by the display device 402 with an identifier of "HD TV." Along similar lines, the audio control (e.g., audio feed and/or microphone control) may be controlled by a device with an identifier of "Headset." Finally, the input control may be controlled by the gaming controller 408 with an identifier of "Gaming Controller."

As shown in this example, a user may select that the client device 412 should obtain control of the video control element and the input control element for the gaming session without also pulling control of the audio control element. Accordingly, in response to detecting the trigger condition in addition to detecting a selection of the corresponding control elements, the client device 412 can obtain video control and input control while allowing the headset to continue receiving audio content from the gaming console 406.

Figure 5:
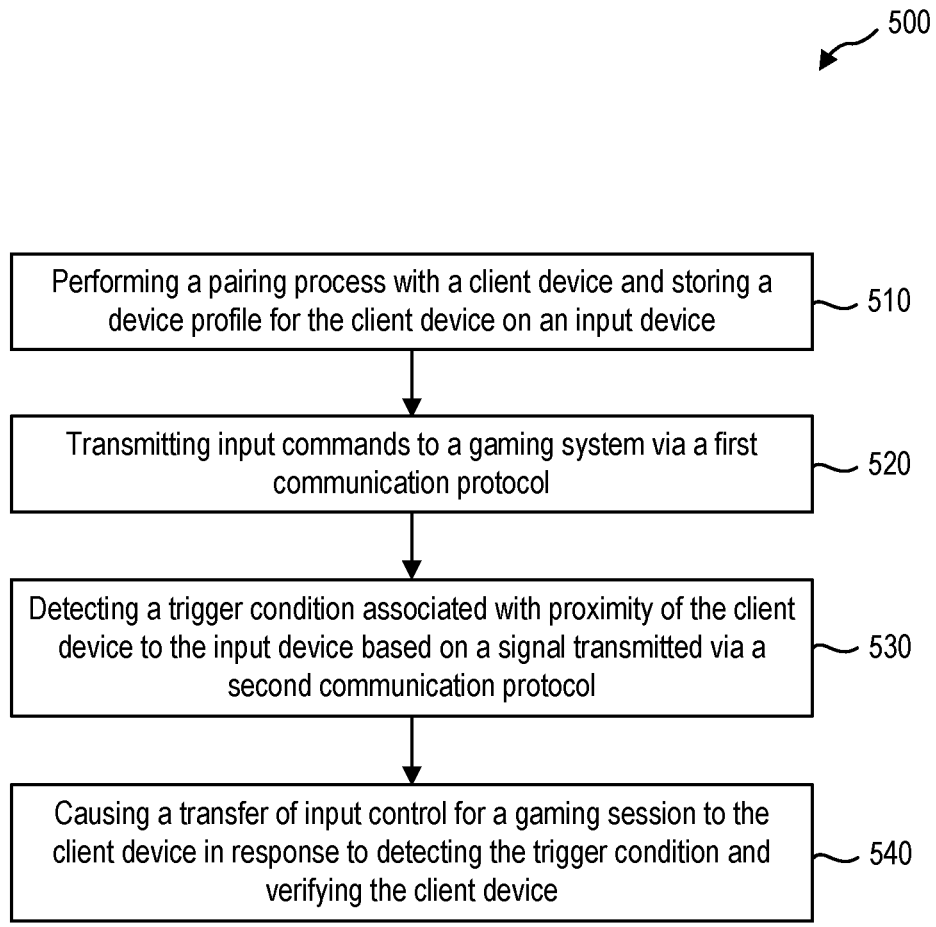
FIG. 5 illustrates an example series of acts for causing a transfer of input control for a gaming session from an input device to a client device in accordance with one or more embodiments.
Figure 6:
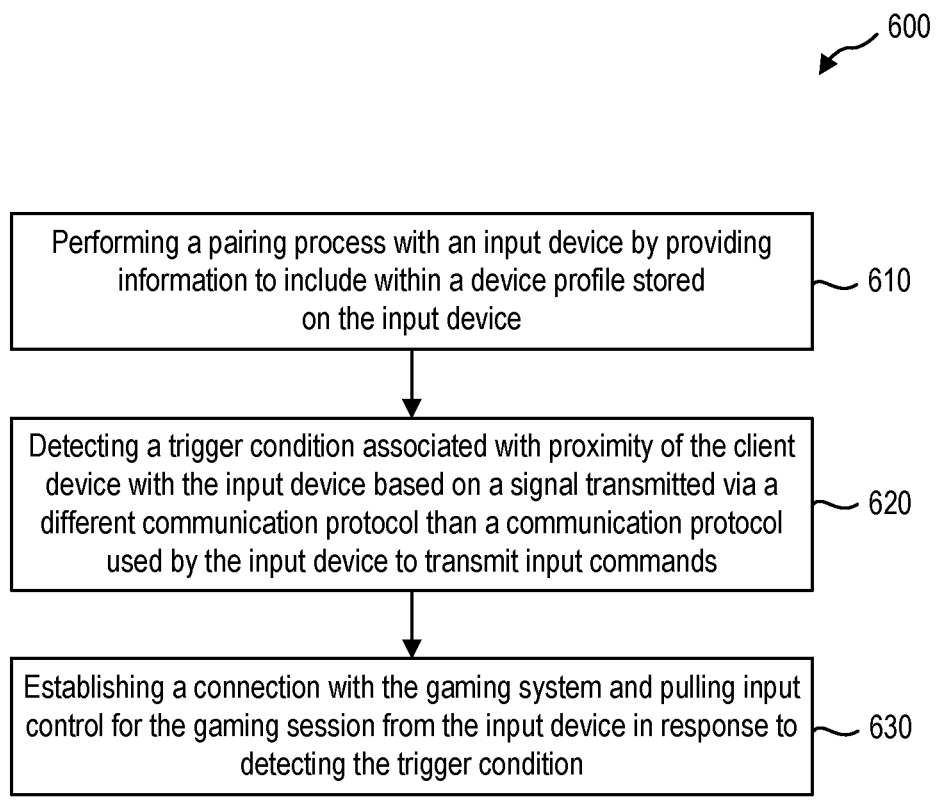
FIG. 6 illustrates another example series of acts for causing a transfer of input control for a gaming session from an input device to a client device in accordance with one or more embodiments.

Turning now to FIGS. 5-6, these figures illustrates example flowcharts including series of acts for transferring one or more control elements for a gaming session between various devices. While FIGS. 5-6 illustrate acts according to one or more embodiments, alternative embodiments may omit, add to, reorder, and/or modify any of the acts shown in FIGS. 5-6. The acts of FIGS. 5-6 can be performed as part of a method. Alternatively, a non-transitory computer-readable medium can comprise instructions that, when executed by one or more processors, cause a computing device (e.g., input device, gaming console, client device) to perform the acts of FIGS. 5-6. In still further embodiments, a system can perform the acts of FIG. 5-6.

FIG. 5 illustrates an example series of acts 500 related to detecting a trigger condition and causing a transfer of one or more control elements for a gaming session from an input device to a client device. In particular, the series of acts 500 may include an act 510 of performing a pairing process with a client device and storing a device profile for the client device on an input device. For example, the act 510 may involve performing a pairing process with a client device where performing the pairing process includes storing a device profile on the input device including information associated with the client device.

As further shown, the series of acts 500 may include an act 520 of transmitting input commands to a gaming system via a first communication protocol. For example, the act 520 may include transmitting input commands for a gaming session to a gaming system via a first communication protocol. In one or more embodiments, the gaming system is implemented on one or more server devices on a cloud computing system. In one or more embodiments, the gaming system is implemented on a local gaming console in communication with the client device via a different communication protocol than the first communication protocol.

As further shown, the series of acts 500 may include an act 530 of detecting a trigger condition associated with proximity of the client device to the input device based on a signal transmitted via a second communication protocol. For example, the act 530 may involve detecting, by the input device, a trigger condition associated with proximity of the client device to the input device based on a signal transmitted by the input device via a second communication protocol.

In one or more embodiments, the first communication protocol includes a proprietary wireless communication protocol unique to the input device and the gaming system. Further, the second communication protocol may include a different wireless communication protocol from the proprietary wireless communication protocol. In one or more implementations, the input device transmits input commands via the first communication protocol using a first antenna on the input device. Further, the signal transmitted by the input device using the second communication protocol may be transmitted using a second antenna on the input device.

As further shown, the series of acts 500 may include an act 540 of causing a transfer of input control for a gaming session to the client device in response to detecting the trigger condition and verifying the client device. For example, the act 540 may include causing a transfer of input control for the gaming session to the client device in response to detecting the trigger condition and verifying that the client device corresponds to the device profile. In one or more embodiments, video content for the gaming session is received at a display device in communication with the gaming system prior to detecting the trigger condition. Further, the series of acts 500 may include causing the video content to be provided to the client device after detecting the trigger condition.

In one or more embodiments, the series of acts 500 includes transmitting a low energy wireless signal (e.g., BLE signal) via the second communication protocol in conjunction with transmitting input commands for the gaming session to the gaming system via the first communication protocol. Further, in one or more embodiments, detecting the trigger condition includes detecting that the input device is within a threshold proximity to the input device based on receiving, from the client device, a response to the low energy wireless signal transmitted via the second communication protocol. In one or more implementations, transmitting the low energy wireless signal includes periodically transmitting a plurality of low energy wireless signals from the input device via the second communication protocol.

In one or more embodiments, the series of acts 500 includes maintaining, on the input device, a plurality of device profiles corresponding to a plurality of client devices with which the input device has previously performed one or more pairing processes. The series of acts 500 may further include detecting, by the input device, an additional trigger condition associated with proximity of an additional client device associated with an additional device profile from the plurality of device profiles via the second communication protocol. In response to detecting the additional trigger condition, the series of acts 500 may additionally include causing a transfer of input control from the client device to the additional client device.

In one or more implementations, video content is provided for display via a display device independent from the input device prior to detecting the trigger condition. Further, in one or more implementations, the client device may include a mobile device having an application associated with the gaming system implemented thereon and configured to continue the gaming session thereon by pulling input control from the input device to the client device and requesting that video content be provided to the client device rather than the display device in response to detecting the trigger condition.

FIG. 6 illustrates another example series of acts 600 related to detecting a trigger condition between an input device and client device and facilitating continuation of a gaming session on the client device. As shown in FIG. 6, the series of acts 600 includes an act 610 of performing a pairing process with an input device by providing information to include within a device profile stored on the input device. For example, in one or more embodiments, the act 610 includes performing a pairing process with an input device where performing the pairing process includes providing information to include within a device profile associated with the client device stored on the input device.

As further shown, the series of acts 600 may include an act 620 of detecting a trigger condition associated with proximity of the client device with the input device based on a signal transmitted via a different communication protocol than a communication protocol used by the input device to transmit input commands. For example, in one or more embodiments, the act 620 may include detecting a trigger condition associated with proximity of the client device with the input device where the input device has input control for a gaming session prior to detecting the trigger condition. The input device may be connected with the gaming system hosting the gaming session via a first communication protocol. In addition, the input device may detect the trigger condition based on a signal transmitted by the input device via a second communication protocol.

As further shown, the series of acts 600 may include an act 630 of establishing a connection with the gaming system and pulling input control for the gaming session from the input device in response to detecting the trigger condition. For example, the act 630 may include, in response to detecting the trigger condition, establishing, by the client device, a connection with the gaming system and continuing the gaming session with the gaming system by pulling input control for the gaming session from the input device to the client device. The gaming session may be implemented on one or more server devices on a cloud computing system. The gaming session may also be implemented on a local gaming console in communication with the client device using a different communication protocol than the first communication protocol.

In one or more embodiments, the first communication protocol includes a proprietary wireless communication protocol unique to the input device and the gaming system while the second communication protocol includes a different wireless communication protocol from the proprietary wireless communication protocol. Further, in one or more embodiments, continuing the gaming session includes providing, by the client device, a request to receive video content for the gaming session from the gaming system, wherein the video content is previously provided to a display device connected to the gaming system prior to detecting the trigger condition. Continuing the gaming session may further include receiving the video content for the gaming session to display via a graphical user interface of the client device.

The series of acts 600 may further include, in response to detecting the trigger condition, providing a plurality of selectable options associating with pulling control of one or more gaming session control elements for the gaming session via a graphical user interface of the client device. The one or more gaming session control elements may include one or more of input control, video control, or audio control for the gaming session. In addition, pulling input control from the gaming session may include pulling input control from the input device to the client device based on a detected selection of a first selectable option from the plurality of selectable options provided via the graphical user interface. In one or more implementations, the series of acts 600 further includes detecting a selection of a second selectable option from the plurality of selectable options associated with video control for the gaming session and pulling video control for the gaming session by providing a request to receive video content for the gaming session from the gaming system at the client device.

Figure 7:
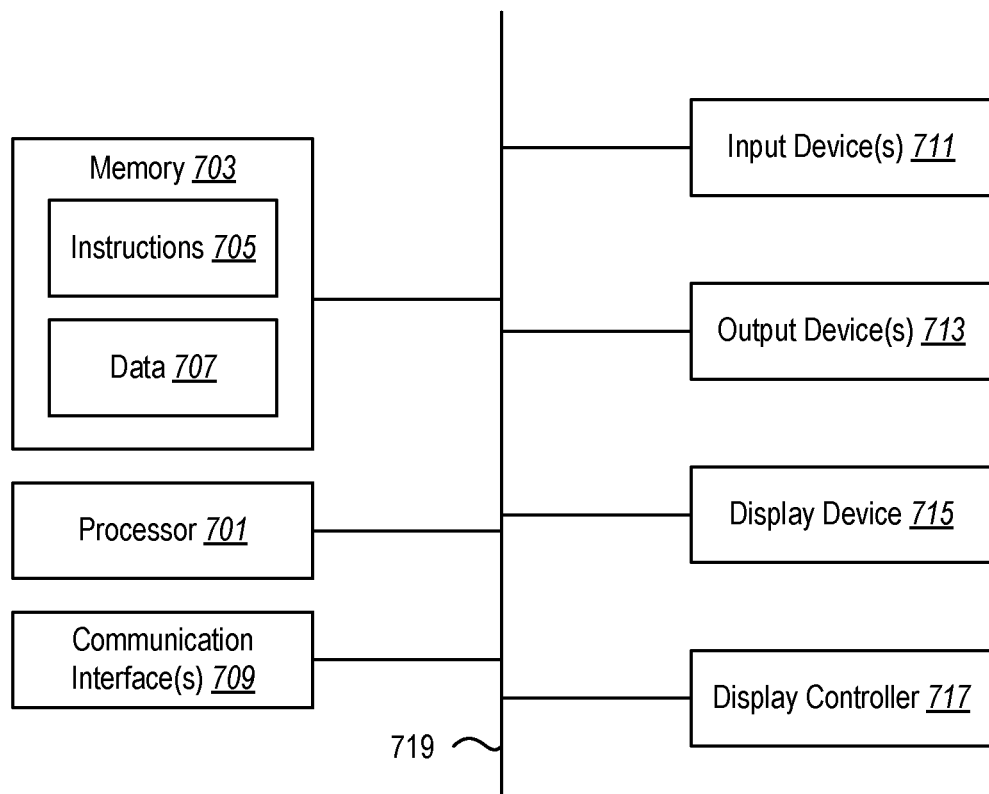
FIG. 7 illustrates certain components that may be included within a computer system.

FIG. 7 illustrates certain components that may be included within a computer system 700. One or more computer systems 700 may be used to implement the various devices, components, and systems described herein.

The computer system 700 includes a processor 701. The processor 701 may be a general purpose single- or multi-chip microprocessor (e.g., an Advanced RISC (Reduced Instruction Set Computer) Machine (ARM)), a special-purpose microprocessor (e.g., a digital signal processor (DSP)), a microcontroller, a programmable gate array, etc. The processor 701 may be referred to as a central processing unit (CPU). Although just a single processor 701 is shown in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 705 and data 707 may be stored in the memory 703. The instructions 705 may be executable by the processor 701 to implement some or all of the functionality disclosed herein. Executing the instructions 705 may involve the use of the data 707 that is stored in the memory 703. Any of the various examples of modules and components described herein may be implemented, partially or wholly, as instructions 705 stored in memory 703 and executed by the processor 701. Any of the various examples of data described herein may be among the data 707 that is stored in memory 703 and used during execution of the instructions 705 by the processor 701.

A computer system 700 may also include one or more communication interfaces 709 for communicating with other electronic devices. The communication interface(s) 709 may be based on wired communication technology, wireless communication technology, or both. Some examples of communication interfaces 709 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 700 may also include one or more input devices 711 and one or more output devices 713. Some examples of input devices 711 include a keyboard, mouse, microphone, remote control device, button, joystick, trackball, touchpad, and lightpen. Some examples of output devices 713 include a speaker and a printer. One specific type of output device that is typically included in a computer system 700 is a display device 715. Display devices 715 used with embodiments disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For the sake of clarity, the various buses are illustrated in FIG. 7 as a bus system 719.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method performed by an input device, comprising:
    performing a pairing process with a client device, wherein performing the pairing process comprises storing a device profile on the input device including information associated with the client device;
    transmitting input commands for a gaming session to a gaming system via a first communication protocol;
    periodically transmitting, via a second communication protocol, signals from the input device to the client device;
    determining a current distance between the input device and the client device based on receiving a response to the periodically transmitted signals from the input device to the client device;
    identifying, by the input device, a trigger condition associated with a preference to transfer control of one or more control elements from the input device to the client device, wherein the trigger condition is based on the current distance between the input device and the client device being less than a threshold distance; and
    causing a transfer of input control for the gaming session to the client device in response to identifying the trigger condition and verifying that the client device corresponds to the device profile.

2. The method of claim 1, wherein the first communication protocol comprises a proprietary wireless communication protocol unique to the input device and the gaming system, and wherein the second communication protocol comprises a different wireless communication protocol from the proprietary wireless communication protocol.

3. The method of claim 1, wherein the input device transmits input commands via the first communication protocol using a first antenna on the input device, and wherein the signal transmitted by the input device using the second communication protocol is transmitted using a second antenna on the input device.

4. The method of claim 1, wherein the gaming system is implemented on one or more server devices on a cloud computing system.

5. The method of claim 1, wherein the gaming system is implemented on a local gaming console in communication with the client device via a different communication protocol than the first communication protocol.

6. The method of claim 1,
    wherein periodically transmitting the signals from the first input device to the client device includes transmitting low energy wireless signal via the second communication protocol in conjunction with transmitting input commands for the gaming session to the gaming system via the first communication protocol.

7. The method of claim 1, wherein video content for the gaming session is received at a display device in communication with the gaming system prior to identifying the trigger condition, the method further comprising causing the video content to be provided to the client device after identifying the trigger condition.

8. The method of claim 1, further comprising:
    maintaining, on the input device, a plurality of device profiles corresponding to a plurality of client devices with which the input device has previously performed one or more pairing processes;
    detecting, by the input device, an additional trigger condition associated with proximity of an additional client device associated with an additional device profile from the plurality of device profiles via the second communication protocol; and
    in response to detecting the additional trigger condition, causing a transfer of input control from the client device to the additional client device.

9. The method of claim 1,
    wherein video content is provided for display via a display device independent from the input device prior to identifying the trigger condition, and
    wherein the client device comprises a mobile device having an application associated with the gaming system implemented thereon and configured to continue the gaming session thereon by pulling input control from the input device to the client device and requesting that video content be provided to the client device rather than the display device in response to identifying the trigger condition.

10. A method performed by a client device, comprising:
    performing a pairing process with an input device, wherein performing the pairing process comprises providing information to include within a device profile associated with the client device stored on the input device;
    detecting a plurality of signals periodically transmitted from the input device;
    transmitting, to the input device, responses to the plurality of signals;

identifying a trigger condition associated with a threshold distance between the client device and the input device, the threshold distance being defined by a setting of the input device associating the threshold distance with a preference to transfer control of one or more control elements from the input device to the client device, wherein the input device has input control for a gaming session prior to detecting the trigger condition, wherein the input device is connected with a gaming system hosting the gaming session via a first communication protocol, and wherein the trigger condition is identified based on a current distance between the client device and the input device being less than the threshold distance, the current distance being determined based on the responses transmitted to the input device via a second communication protocol;

in response to identifying the trigger condition:
establishing, by the client device, a connection with the gaming system; and
continuing the gaming session with the gaming system by pulling input control for the gaming session from the input device to the client device.

11. The method of claim 10, wherein the first communication protocol comprises a proprietary wireless communication protocol unique to the input device and the gaming system, and wherein the second communication protocol comprises a different wireless communication protocol from the first communication protocol.

12. The method of claim 10, wherein continuing the gaming session further comprises:
providing, by the client device, a request to receive video content for the gaming session from the gaming system, wherein the video content is previously provided to a display device connected to the gaming system prior to identifying the trigger condition; and
receiving the video content for the gaming session to display via a graphical user interface of the client device.

13. The method of claim 10, further comprising:
in response to identifying the trigger condition, providing a plurality of selectable options associating with pulling control of one or more gaming session control elements for the gaming session via a graphical user interface of the client device, the one or more gaming session control elements including one or more of input control, video control, or audio control for the gaming session, and
wherein pulling input control from the gaming session from the input device to the client device is based on a detected selection of a first selectable option from the plurality of selectable options provided via the graphical user interface.

14. The method of claim 13, further comprising:
detecting a selection of a second selectable option from the plurality of selectable options associated with video control for the gaming session; and
pulling video control for the gaming session by providing a request to receive video content for the gaming session from the gaming system at the client device.

15. The method of claim 10, wherein the gaming system is implemented on one or more server devices on a cloud computing system.

16. The method of claim 10, wherein the gaming system is implemented on a local gaming console in communication with the client device using a different communication protocol than the first communication protocol.

17. A system, comprising:
one or more processors;
memory in electronic communication with the one or more processors; and
instructions stored in the memory, the instructions being executable by the one or more processors to cause an input device to:
perform a pairing process with a client device, wherein performing the pairing process comprises storing a device profile on the input device including information associated with the client device;
transmit input commands for a gaming session to a gaming system via a first communication protocol;
periodically transmit, via a second communication protocol, signals from the input device to the client device;
determine a current distance between the input device and the client device based on receiving a response to the periodically transmitted signals from the input device to the client device;
identify, by the input device, a trigger condition associated with a preference to transfer control of one or more control elements from the input device to the client device, wherein the trigger condition is based on the current distance between the input device and the client device being less than a threshold distance; and
cause a transfer of input control for the gaming session to the client device in response to identifying the trigger condition and verifying that the client device corresponds to the device profile.

18. The system of claim 17,
wherein the input device transmits input commands via a first wireless communication protocol using a first antenna on the input device, and
wherein the signal transmitted by the input device via the second communication protocol is transmitted via a second wireless communication protocol using a second antenna on the input device.

19. The system of claim 17, wherein video content for the gaming session is received at a display device in communication with the gaming system prior to identifying the trigger condition, the system further comprising instructions being executable by the one or more processors to cause the input device to cause the video content to be provided to the client device after identifying the trigger condition.

20. The system of claim 17, further comprising instructions being executable by the one or more processors to:
maintain, on the input device, a plurality of device profiles corresponding to a plurality of client devices with which the input device has previously performed one or more pairing processes;
detect, by the input device, an additional trigger condition associated with proximity of an additional client device associated with an additional device profile from the plurality of device profiles via the second communication protocol; and
in response to detecting the additional trigger condition, cause a transfer of input control from the client device to the additional client device.

* * * * *